Patented May 25, 1937

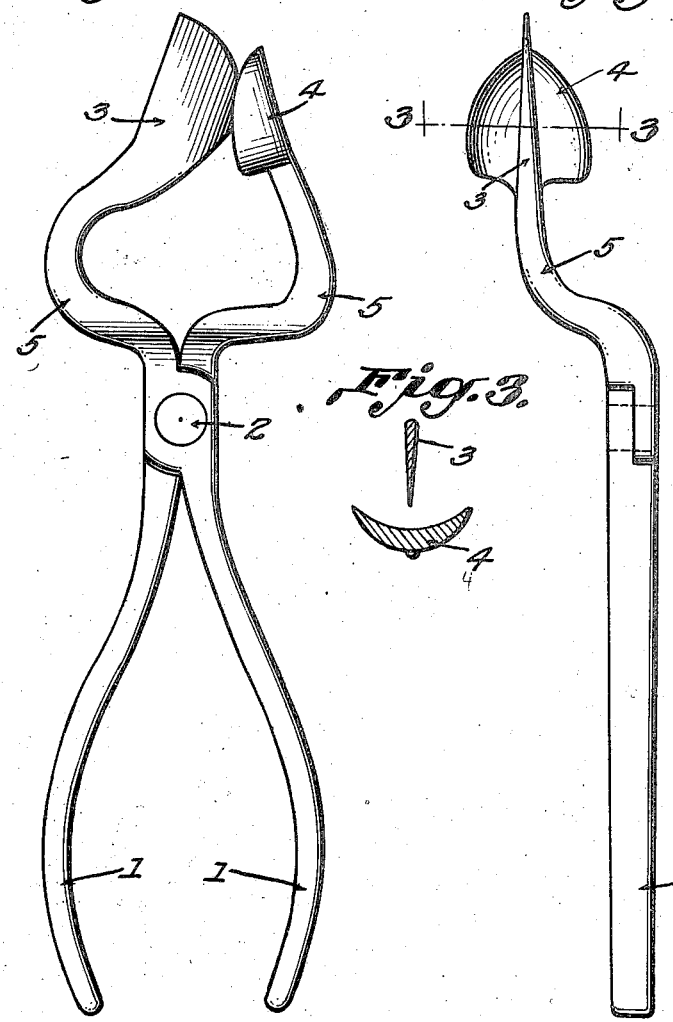

2,081,229

UNITED STATES PATENT OFFICE 2,081,229

POULTRY-KILLING DEVICE

William John Fisher, William Aldred Fisher, Alvin Clarence Fisher, Evans Fisher, and Victor Hubert Fisher, Tyvan, Saskatchewan, Canada Application November 2, 1932, Serial No. 640,844. Renewed January 21, 1937. In Canada October 11, 1932

3 Claims. (Cl. 17—11)

Our invention relates to improvements in poultry killing devices and an object of the invention is to provide a device of this character consisting of a pair of plier-like handles having a hood upon the end of one handle and an arcuate bladed knife upon the other handle which is designed to cleave the skull of the fowl for the purpose of killing and bleeding.

A further object of our invention is to provide a device of this character which eliminates the risk of missing the fowl's brain in this process of killing.

A further object of our invention is to provide a device of this character which will insure that both arteries leading from the brain are severed at the proper point and in which the blade opens the brain and cleaves the encasing bone so that the fowl will bleed readily.

A further object of our invention is to provide a device of this character which will enable the user to keep his hands clean and free from blood.

A further object of our invention is to provide a device of this character which by piercing the upper convolutions of the brain, will cause the loosening of the feathers so that the fowl may be easily plucked.

With the foregoing more important objects in view and such other minor objects as may appear as the specification proceeds, our invention consists essentially in the arrangement and construction of parts all as hereinafter more particularly described, reference being had to the accompanying drawing, in which:—

Fig. 1 shows a side elevation of our invention.

Fig. 2 shows an end elevation of our invention.

Fig. 3 is a section upon the line 3—3 of Figure 2.

In the drawing like characters of reference indicate corresponding parts in the several figures.

Our invention consists of a pair of plier-like handles 1 pivoted upon a shank 2. Upon the forward side of the pivot, the handles are extended to form a blade 3 and a hood 4 respectively. These portions are offset as at 5 with respect to the longitudinal axis of the handles so that in the case of killing a goose for instance, the beak will not be in the way of the handles, thus enabling the blade to enter the brain and the encasing bone at the centre thereof and parallel with the beak.

In operation, one preferably grasps the bird by the neck, opens the beak and inserts the blade 3, allowing the hood 4 to rest upon the cranium of the bird, whereupon, the two handles 1 and 2 will be drawn together by a gripping action, thus piercing the brain.

Thus it will be seen that we have provided a device which will slaughter a bird such as a chicken or goose efficaciously and cleanly, in such a manner as to enable the feathers of the bird to be plucked without difficulty.

Since various modifications can be made in the above invention, and many apparently widely different embodiments of same made within the scope of the claims without departing from the spirit and scope thereof, it is intended that all matter contained in the accompanying specification shall be interpreted as illustrative only and not in a limiting sense and we desire only such limitations placed thereon as are specifically expressed in the accompanying claims.

We claim as our invention, and desire to secure by Letters Patent:

1. In combination, a pair of pivotally connected handles extended beyond the pivot point in a pair of opposing laterally offset arms, a head fitting hood carried by the free extremity of one of the arms and a curved cutting blade permanently secured to the free extremity of the other of the arms and centrally opposing the hood.

2. In combination, a pair of plier like pivotally connected handles extending beyond their pivot point in a pair of laterally offset opposing arms the longitudinal axis of which are positioned in a plane lying parallel to the plane of the longitudinal axes of the handles, a head fitting hood carried by the free end of one of the arms and a curved cutting blade carried by the free end of the other of the arms and centrally opposing the hood.

3. In combination, a pair of pivotally connected plier like handles extended beyond their pivot point in a pair of laterally offset opposing arms the longitudinal axes of which are positioned in a plane lying parallel to the plane of the longitudinal axes of the handles and both of said arms being outwardly bowed in respect to one another, a head fitting hood permanently secured to the free end of one of the arms and a curved cutting blade secured to the free end of the other of the arms and centrally opposing the hood.

WILLIAM JOHN FISHER.
WILLIAM ALDRED FISHER.
ALVIN CLARENCE FISHER.
EVANS FISHER.
VICTOR HUBERT FISHER.